(12) United States Patent     (10) Patent No.: US 12,695,957 B2
Lan     (45) Date of Patent: Jul. 28, 2026

(54) INFORMATION PROCESSING METHOD, LIVE STREAMING SYSTEM AND ELECTRONIC DEVICE

(71) Applicant: Alibaba (China) Co., Ltd., Hangzhou (CN)

(72) Inventor: Tian Lan, Hangzhou (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/929,746

(22) Filed: Oct. 29, 2024

(65)     Prior Publication Data

US 2025/0056099 A1    Feb. 13, 2025

Related U.S. Application Data

(63) Continuation of application No. PCT/CN2023/089665, filed on Apr. 21, 2023.

(30)     Foreign Application Priority Data

Apr. 29, 2022    (CN) .......................... 202210476297.3

(51) Int. Cl.
   *H04N 21/488*     (2011.01)
   *H04N 21/2187*     (2011.01)
       (Continued)

(52) U.S. Cl.
   CPC ..... *H04N 21/4882* (2013.01); *H04N 21/2187* (2013.01); *H04N 21/4532* (2013.01); *H04N 21/47815* (2013.01)

(58) Field of Classification Search
   CPC ........................ H04N 21/4882; H04N 21/2187
   See application file for complete search history.

(56)     References Cited

U.S. PATENT DOCUMENTS 11,327,628 B2    5/2022   He et al.
11,653,051 B2    5/2023   Lin et al.
         (Continued)

FOREIGN PATENT DOCUMENTS

CN     111866532 A    10/2020
CN     111935554 A    11/2020
         (Continued)

OTHER PUBLICATIONS

Fourth Office Action for Chinese Application No. 202210476297.3 mailed on Nov. 29, 2024.
         (Continued)

*Primary Examiner* — Nnenna N Ekpo
(74) *Attorney, Agent, or Firm* — Sheppard Mullin Richter & Hampton LLP

(57)     ABSTRACT

The present application provides an information processing method, which comprises determining a target live streaming room that the user has not viewed; acquiring first preset information related to the user; determining at least one live streaming object matching the first preset information based on live streaming content of the target live streaming room that the user has not viewed; generating a push notification related to the at least one live streaming object; displaying the push notification. By adopting the solution, the user does not need to continuously view the live streaming content of the target live streaming room. The user can enter the live streaming room to view after seeing the push notification, or the user can find at least one live transaction link of the live streaming object based on the push notification after the live stream in the target live streaming room has ended.

19 Claims, 7 Drawing Sheets

(51) Int. Cl.
*H04N 21/45* (2011.01)
*H04N 21/478* (2011.01)

(56) References Cited

U.S. PATENT DOCUMENTS

| | | | | |
|---|---|---|---|---|
| 11,895,354 | B2 | 2/2024 | Li et al. | |
| 12,088,887 | B2 | 9/2024 | Yang et al. | |
| 2007/0157220 | A1* | 7/2007 | Cordray | H04H 60/65 |
| | | | | 386/E5.07 |
| 2017/0078707 | A1 | 3/2017 | Barber | |
| 2017/0078758 | A1* | 3/2017 | Lewis | H04N 21/262 |
| 2018/0025405 | A1* | 1/2018 | Jones | G06V 20/46 |
| | | | | 705/26.7 |
| 2020/0099960 | A1 | 3/2020 | Yu et al. | |
| 2021/0014571 | A1* | 1/2021 | Landow | H04N 21/4784 |
| 2022/0279217 | A1* | 9/2022 | Yao | G06Q 30/0252 |
| 2024/0397120 | A1* | 11/2024 | Zhou | H04N 21/231 |

FOREIGN PATENT DOCUMENTS

| | | | |
|---|---|---|---|
| CN | 112312156 | A | 2/2021 |
| CN | 112312211 | A | 2/2021 |
| CN | 112399200 | A | 2/2021 |
| CN | 112492334 | A | 3/2021 |
| CN | 113099249 | A | 7/2021 |
| CN | 112188297 | B | 10/2021 |
| CN | 111918075 | B | 12/2021 |
| CN | 114155051 | A | 3/2022 |
| CN | 114187075 | A | 3/2022 |
| CN | 110139121 | B | 8/2022 |
| CN | 114928750 | A | 8/2022 |
| CN | 112399200 | B | 1/2023 |
| CN | 112055225 | B | 2/2023 |
| CN | 113015012 | B | 5/2023 |
| CN | 112104899 | B | 3/2024 |
| WO | 2017166517 | A1 | 10/2017 |
| WO | 2019128787 | A1 | 7/2019 |
| WO | 2022121557 | A1 | 6/2022 |
| WO | 2022121593 | A1 | 6/2022 |

OTHER PUBLICATIONS

International Preliminary Report on Patentability Chapter I for International Application No. PCT/CN2023/089665 mailed on Nov. 7, 2024.
Rejection Decision for Chinese Application No. 202210476297.3 mailed on Feb. 14, 2025.
Extended European Search Report for European Application No. 23795203.1 mailed on Mar. 11, 2025.
Written Opinion of the International Searching Authority and International Search Report for International Application No. PCT/CN2023/089665 mailed on Jun. 26, 2023.
First Office Action for Chinese Application No. 202210476297.3 mailed on Jan. 10, 2024.
First Search Report for Chinese Application No. 202210476297.3 mailed on Jan. 5, 2024.
Second Office Action for Chinese Application No. 202210476297.3 mailed on Jun. 1, 2024.
Third Office Action for Chinese Application No. 202210476297.3 mailed on Aug. 30, 2024.

* cited by examiner

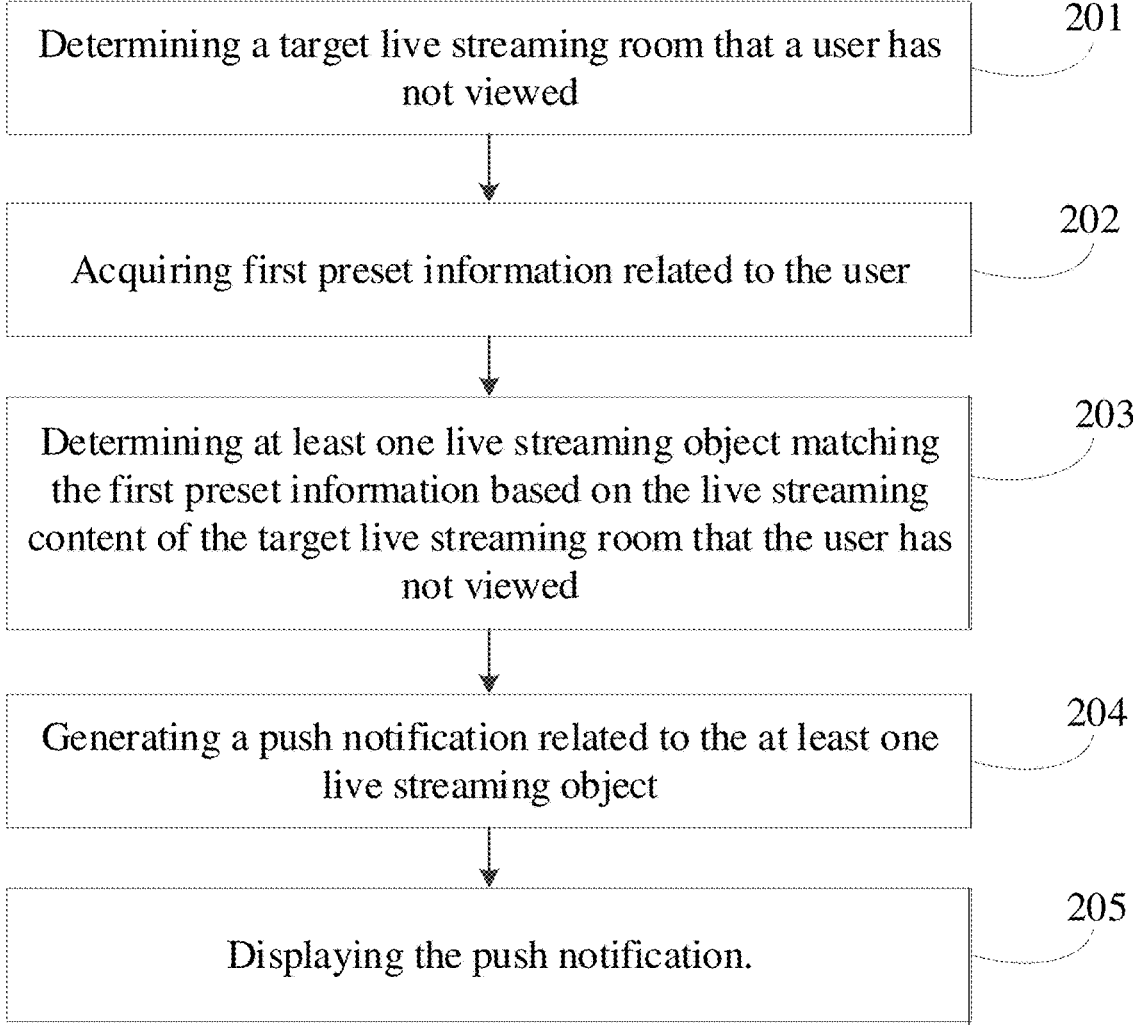

Determining a target live streaming room that a user has not viewed    201

Acquiring first preset information related to the user    202

Determining at least one live streaming object matching the first preset information based on the live streaming content of the target live streaming room that the user has not viewed    203

Generating a push notification related to the at least one live streaming object    204

Displaying the push notification.    205

FIG. 2

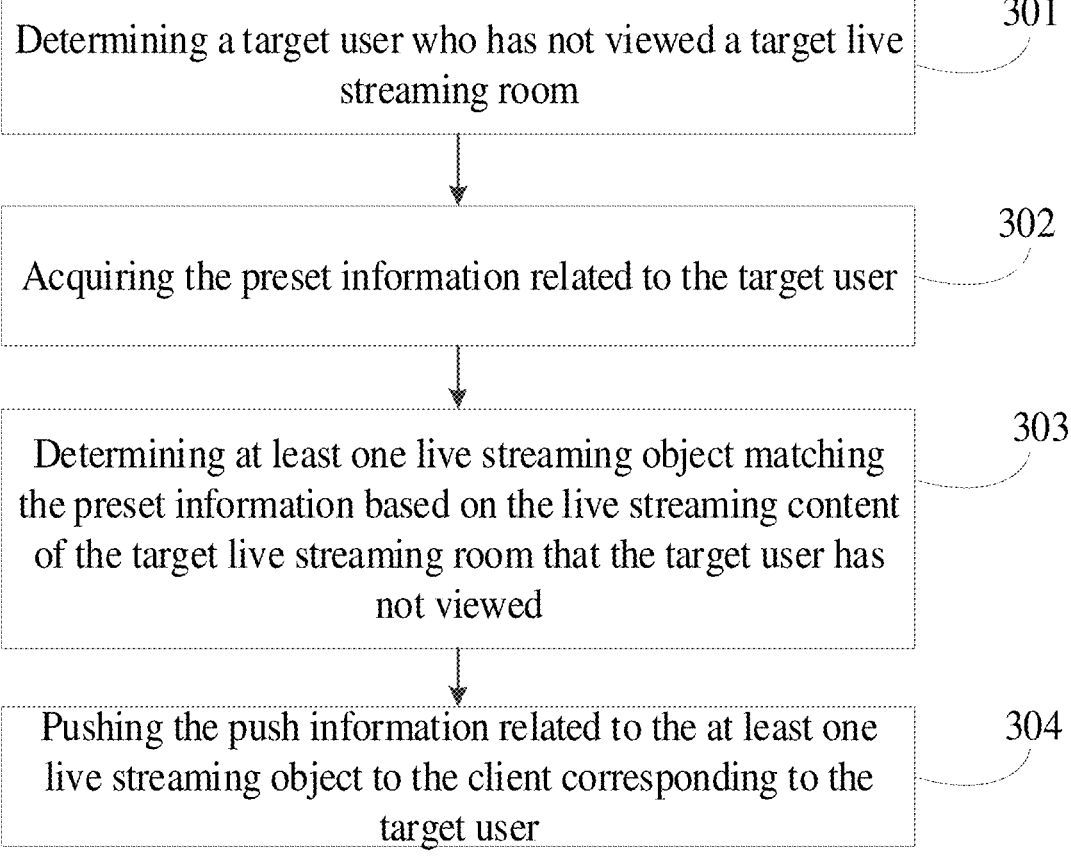

Determining a target user who has not viewed a target live streaming room          301

Acquiring the preset information related to the target user          302

Determining at least one live streaming object matching the preset information based on the live streaming content of the target live streaming room that the target user has not viewed          303

Pushing the push information related to the at least one live streaming object to the client corresponding to the target user          304

FIG. 4

INFORMATION PROCESSING METHOD, LIVE STREAMING SYSTEM AND ELECTRONIC DEVICE

CROSS-REFERENCE TO RELATED APPLICATIONS

This application is a continuation application of International Patent Application No. PCT/CN2023/089665, filed on Apr. 21, 2023, which is based on and claims the priority to and benefits of Chinese Patent Application 202210476297.3, filed with the China National Intellectual Property Administration on Apr. 29, 2022, and entitled "Information Processing Method, Live Streaming System, and Electronic Device." The above referenced applications are incorporated herein by reference in their entirety.

TECHNICAL FIELD

The present application relates to the field of computer network technology, particularly to an information processing method, a live streaming system, and an electronic device.

BACKGROUND

Live shopping integrates live streaming with e-commerce. The live streamers present products they intend to sell in their live streaming room and display corresponding live purchase links (e.g., in the form of images) on a live streaming interface. If users want to make a purchase, they only need to click on the live purchase link to proceed with subsequent purchasing operations.

Typically, more than one product is showcased in a live streaming room. During the live streaming, various products are presented sequentially, and some of these products may not interest the user. To see the products they wish to purchase, users need to continuously monitor the live stream, leading to a poor shopping experience. If users suddenly become occupied and cannot continue viewing the live streaming, they may miss the products they want to buy.

SUMMARY

In view of the aforementioned problems, the present application provides an information processing method, a live streaming system, and an electronic device to solve or at least partially address the above issues.

In one embodiment of the present application, an information processing method is provided. The method comprises: determining a target live streaming room that a user has not viewed; acquiring first preset information related to the user; based on live streaming content of a target live streaming room that the user has not viewed, determining at least one live streaming object that matches the first preset information; generating a push notification related to the at least one live streaming object; displaying the push notification.

In another embodiment of the present application, an information processing method is also provided. The method comprises: determining a target user who has not viewed the target live streaming room; acquiring preset information related to the target user; based on the live streaming content of the target live streaming room that the target user has not viewed, determining at least one live streaming object that matches the preset information; pushing information related to the at least one live streaming object to a client corresponding to the target user.

In another embodiment of the present application, a live streaming system is provided. The live streaming system includes: a first client, configured to request a target live streaming room from a server and conduct live streaming through the target live streaming room; the server, configured to provide live streaming services for the first client and live viewing services for a second client; the second client, configured to determine a target live streaming room not yet viewed by the user; acquire first preset information related to the user; based on live streaming content of the target live streaming room not viewed by the user, determine at least one live streaming object that matches the first preset information; generate a push notification related to the at least one live streaming object; and display the push notification.

In another embodiment of the present application, a live streaming system is provided. The live streaming system includes: a first client, configured to request a target live streaming room from a server and to perform live streaming through the target live streaming room, and is further configured to determine a target user who has not viewed the target live streaming room; acquire preset information related to the target user; determine at least one live streaming object matching the preset information based on live streaming content of the target live streaming room that the target user has not viewed; push a push notification related to the at least one live streaming object to a client corresponding to the target user through the server; a server, configured to provide live streaming services to the first client and live streaming viewing services to a second client; further configured to store preset information related to multiple second client users, and to provide services for the first client to acquire user-related preset information; a second client, configured to receive and display the push notification pushed by the first client.

In another embodiment of the present application, an electronic device is provided. The electronic device comprises: a processor and a memory; wherein the memory is configured to store one or more computer instructions; the processor is coupled with the memory and configured to execute the one or more computer instructions to implement the steps in the aforementioned method embodiments.

Embodiments of the present application also provide a computer program product. The computer program product comprises a computer program, which, when executed by a computer, causes the computer to implement the steps in the aforementioned method embodiments.

In one technical solution provided by the embodiments of the present application, a target live streaming room that the user has not viewed is first identified, and first preset information related to the user is acquired. Then, based on the live streaming content of the target live streaming room that the user has not viewed, at least one live streaming object that matches the first preset information is determined. A push notification related to the at least one live streaming object is then generated and displayed. This way, the user does not need to continuously view the live streaming content of the target live streaming room. The user can enter the live streaming room to view after seeing the push notification, or even after the live stream in the target live streaming room has ended, the user can still find the live streaming transaction link of at least one live streaming object based on the push notification, or the system can automatically place an order for the user and push the order information to the user, etc., thereby reducing the time the user spends viewing the live streaming and improving the user's shopping experience.

In another technical solution provided by the embodiments of the present application, a target user who has not viewed the target live streaming room is first identified, and preset information related to the target user is acquired. Then, based on the live streaming content of the target live streaming room that the target user has not viewed, at least one live streaming object that matches the preset information is determined. Push notification related to the at least one live streaming object is then sent to the client corresponding to the target user. This embodiment is a solution from the perspective of the live streamer. While live streaming, the live streamer can timely push live streaming objects that may interest users who have not yet viewed the live streaming room, helping to attract more users to enter the live streaming room and view the live stream.

BRIEF DESCRIPTION OF THE DRAWINGS

To more clearly illustrate the technical solutions in the embodiments of the present invention or the prior art, a brief introduction to the accompanying drawings required for describing the embodiments or the prior art is provided below. It is evident that the accompanying drawings described below are some embodiments of the present application. For those of ordinary skill in the art, other drawings can also be obtained based on these drawings without creative efforts.

FIG. 2 is a schematic flow diagram of an information processing method according to an embodiment of the present application;

FIG. 4 is a schematic flow diagram of an information processing method according to another embodiment of the present application;

DETAIL DESCRIPTION OF THE EMBODIMENTS

Due to the prolonged live streaming duration in live streaming rooms, users need to keep the live streaming interface open and continuously view it. If users have something to do in between or want to sleep and close the live streaming application, they will miss the products they are interested in. Therefore, the present application provides a solution for users to discover products that match their preferences in live streaming rooms that they have not viewed, to reduce the time users spend in the live streaming rooms and decrease the rate of missing out on their favorite products. To better help those skilled in the art understand the solutions provided by the present application, the technical solutions in the embodiments of the present application will be clearly and completely described below in conjunction with the accompanying drawings. The specification, claims, and the accompanying drawings of the present application include processes with multiple operations appearing in a specific order. These operations may be performed in a different order or concurrently than as described herein. Operation sequence numbers such as 101, 102, etc., are only used to distinguish different operations and do not represent any execution order. Additionally, these processes may include more or fewer operations, which can be executed sequentially or concurrently. It should be noted that terms like "first," "second," etc., are used to distinguish different information, devices, modules, etc., and do not represent any order, nor do they limit "first" and "second" to being different types. Furthermore, the following embodiments are merely part of the embodiments of the present application and not all of them. Based on the embodiments of the present application, all other embodiments obtained by those skilled in the art without creative efforts fall within the protection scope of the present application.

Live streaming often lasts for a long time, requiring users to continuously monitor the live streaming room to wait for their favorite products. Sometimes, the live streamer may temporarily offer special deals on products in the live streaming room, which makes continuous viewing particularly exhausting for users. With the methods provided in the various embodiments of the present application, users no longer need to keep their eyes glued to the computer or phone screens. Upon receiving the push notification, users can enter the live streaming room to make a purchase, or they can automatically complete the order or add items to their shopping cart without entering the live streaming room.

Figure 1A:
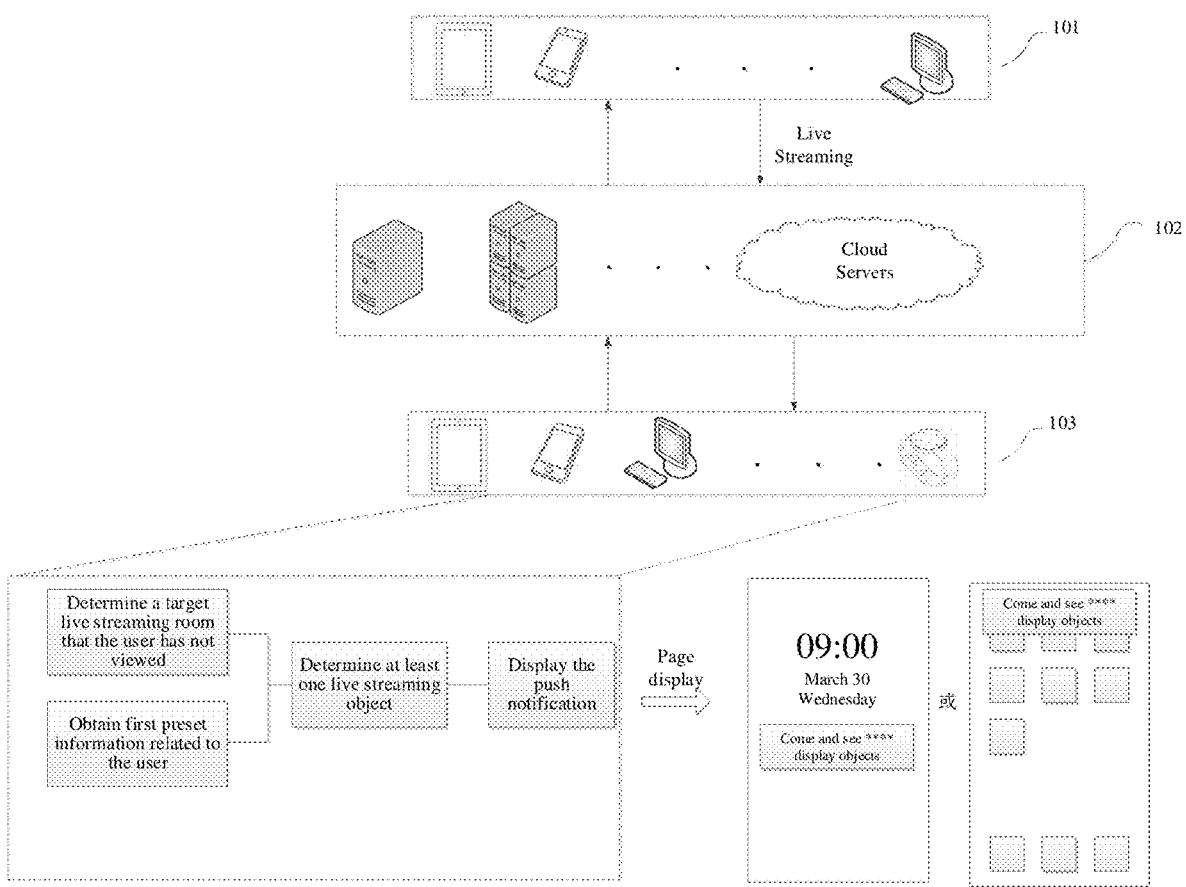
FIG. 1A is a schematic structural diagram of a live streaming system according to an embodiment of the present application.

The solutions provided in the method embodiments of the present application can be applied to any live streaming interaction scenarios, such as online live streaming. The technical solutions of the method embodiments of the present application can be implemented using the system architecture shown in FIG. 1A. Specifically, as shown in FIG. 1A, a schematic structural diagram of a live streaming system provided in an embodiment of the present application is illustrated. This live streaming system comprises: a first client 101, a server 102, and a second client 103. The first client 101 can be the client on the host side, and the second client 103 can be the client on the user side (i.e., the live stream viewer). The clients may include, but are not limited to: smartphones, tablets, personal computers, PDAs (Personal Digital Assistants), smart wearable devices, etc. The server 102 may include, but is not limited to: servers, server clusters, virtual servers, cloud servers, etc. This embodiment does not limit the type of server.

The first client 101 is configured to request a target live streaming room from the server and conduct live streaming through the target live streaming room.

The server 102 is configured to provide live streaming services for the first client and live viewing services for the second client.

The second client 103 is configured to determine a target live streaming room that the user has not viewed; acquire first preset information related to the user; based on the live streaming content of the target live streaming room that the user has not viewed, determine at least one live streaming object that matches the first preset information; generate push notification related to the at least one live streaming object; and display the push notification.

The server 102 provides live streaming services to each second client 103. Users can install the live streaming application on the devices corresponding to the second client 103 to receive live streaming services. Alternatively, they can use the browser client installed on the second client 103 to log into the live streaming page provided by the server and receive live streaming services. Typically, two types of users are involved in the live streaming process: one type is the live streamer, and the other type is the audience. The live streaming application offers both live streaming functionality for live streamers and live stream viewing functionality for the audience. Live streamers can use the live streaming functionality to conduct video broadcasts, while the audience can use the live stream viewing functionality to view the content broadcast by the live streamer.

Typically, the live streaming interface includes a video playback window for playing the video stream sent by the first client 101 on the live streamer side. Additionally, the live streaming interface includes a function display area for displaying functional controls such as sending gifts, posting comments, or sharing. The first client can flexibly configure the display information of objects and the display position and manner of related controls in the live streaming interface according to actual needs. The related controls for the display objects may include, but are not limited to: purchase controls, add-to-cart controls, or favorite controls.

When a user (i.e., the audience) views a live stream through the second client 103, if they are interested in a display object in the live video, they can trigger the related control of the display object to request the second client 103 to initiate the relevant processing.

The live streamer applies for live streaming permission from the server through the first client 101 and then creates a live streaming room to start a video broadcast. During the live broadcast, in order for the audience to see the products the live streamer wants to showcase, it is necessary to associate the object information of the items to be showcased with the live streaming room. Once the association is successful, the live streamer triggers the display of the associated object information (such as live streaming transaction links, which can be in text or image form) in the live streaming room via the first client, for the audience to interact with.

It should be supplemented that the live streaming objects in this embodiment can be various types of content. This content may include movies, music, articles, etc., recommended by the streamer, as well as various products recommended by the streamer, such as clothing, shoes, accessories, bags, books, toys, food, daily necessities, cosmetics, and so on.

As shown in FIG. 1A, the recommended information can be displayed as a message on the lock screen and as a dynamic message on the interface after the client is unlocked. For example, a message box containing the recommended information can slide down from the top of the interface, remain visible for a preset duration, and then disappear from the top of the interface.

Figure 1B:
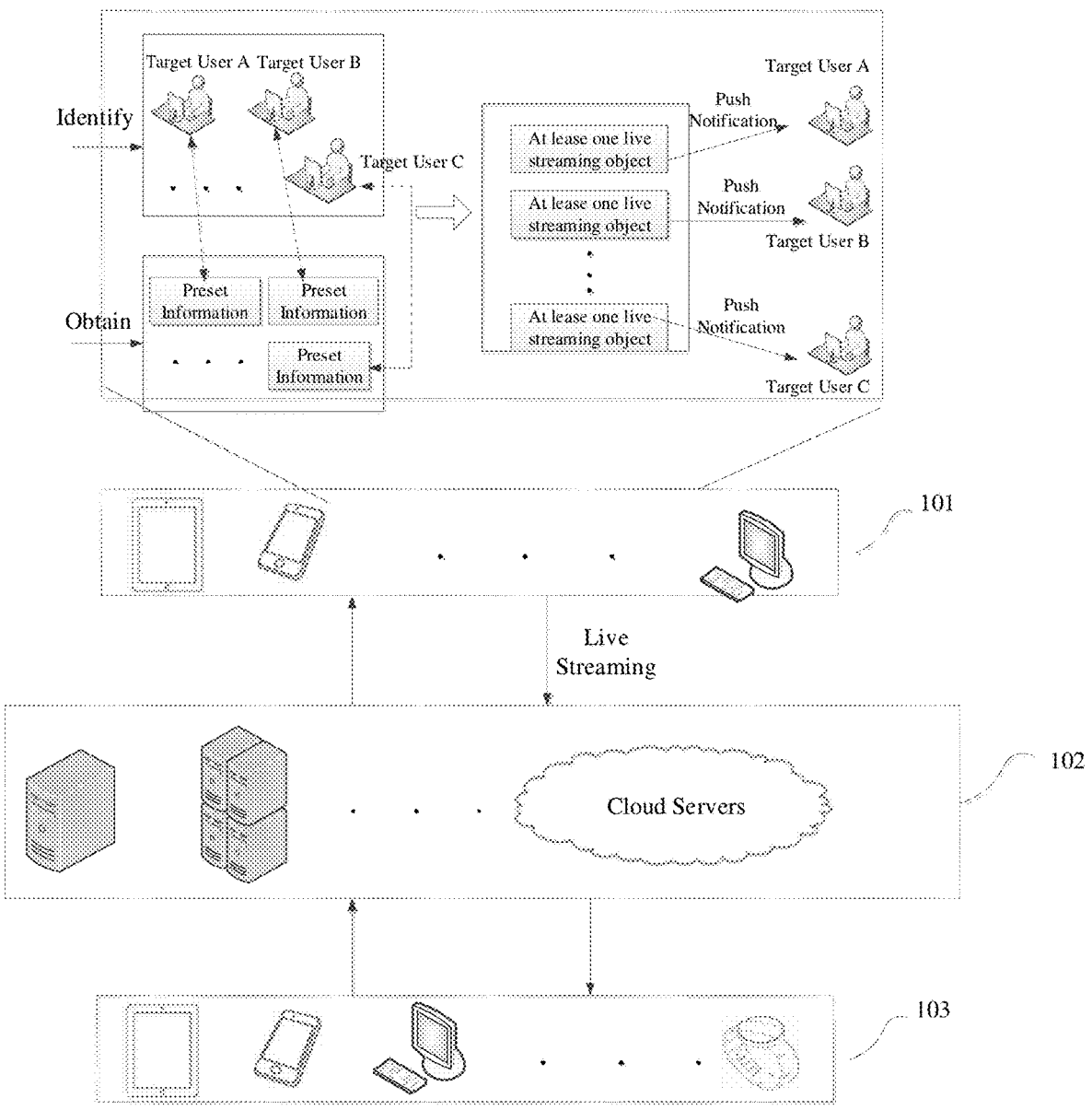
FIG. 1B is another schematic structural diagram of a live streaming system according to an embodiment of the present application.

The above embodiment provides a technical solution from the perspective of the second client 103 (i.e., the audience) to reduce the time spent by the audience viewing the live stream and to decrease the probability of missing the showcased items they are interested in. This application also provides the following solution from the perspective of the first client 101 (i.e., the live streamer). The goal is to enable the live streamer to promptly push notifications of the showcased items to the audience who are not currently viewing the live stream, thereby attracting more viewers to the live streaming room. As shown in the live streaming system in FIG. 1B.

The first client 101 is used to apply to the server for the target live streaming room and to conduct live streaming through the target live streaming room. It is also used to determine a target user who is not viewing the target live streaming room, acquire preset information related to the target user, and based on the live streaming content of the target live streaming room that the target user has not viewed, determine at least one live streaming object that matches the preset information. Additionally, it pushes notification related to the at least one live streaming object to the client corresponding to the target user through the server.

The server 102 is configured to provide live streaming services for the first client and live viewing services for the second client, and is further configured to store preset information related to multiple users of the second client, in order to provide the first client with services for acquiring user-related preset information.

The second client 103 is configured to receive and display the push notification sent by the first client.

In specific implementations, the functions of the first client 101, namely, "determining a target user who has not viewed the target live streaming room; acquiring preset information related to the target user; based on the live streaming content of the target live streaming room that the target user has not viewed, determining at least one live streaming object that matches the preset information; pushing information related to the at least one live streaming object to the client corresponding to the target user," can also be implemented by the server. The first client 101 sends a service request to the server to push notification to users who have not viewed the live stream. Upon receiving this request from the first client 101, the server then performs the functions of "determining a target user who has not viewed the target live streaming room; acquiring preset information related to the target user; based on the live streaming content of the target live streaming room that the target user has not viewed, determining at least one live streaming object that matches the preset information; pushing information related to the at least one live streaming object to the client corresponding to the target user."

More detailed functional descriptions of the first client 101, the second client 103, and the server 102 in the aforementioned system embodiments will be explained in the method embodiments below. That is, in addition to the functions described above, the first client in the system embodiment also has the functionalities corresponding to each step described in the corresponding method embodiments. Similarly, in addition to the functions described above, the second client also has the functionalities corresponding to each step described in the corresponding method embodiments.

FIG. 2 illustrates a schematic flow diagram of an information processing method provided in an embodiment of the present application. The execution subject of the method provided in this embodiment can be the second client in the aforementioned system embodiments. Specifically, as shown in FIG. 2, the method comprises:

201. determining a target live streaming room that the user has not viewed;

202. acquiring first preset information related to the user;

203. based on the live streaming content of the target live streaming room that the user has not viewed, determining at least one live streaming object that matches the first preset information;

204. generating push notification related to the at least one live streaming object;

205. displaying the push notification.

In the aforementioned 201, the live streaming room that the user has not viewed may include a live streaming room that the user has never viewed at all, as well as a live streaming room that the user started viewing but closed midway. The target live streaming room can be among the live streaming rooms that the user has not viewed, including live streaming rooms of live streamers the user is interested in, or live streaming rooms that display objects that the user is interested in, and so on.

In one possible implementation, step 201 of this embodiment, "determining target live streaming rooms that the user has not viewed," may include the following sub-steps:

S11, acquiring second preset information related to the user; among the multiple live streaming rooms that the user has not viewed, determining the target live streaming rooms that match the second preset information; and/or S12, in response to the user closing a live streaming room, determining the closed live streaming room as the target live streaming room; and/or S13, in response to the user closing the screen, determining the live streaming room corresponding to the live streaming content being played before the screen was closed as the target live streaming room.

Figure 3:
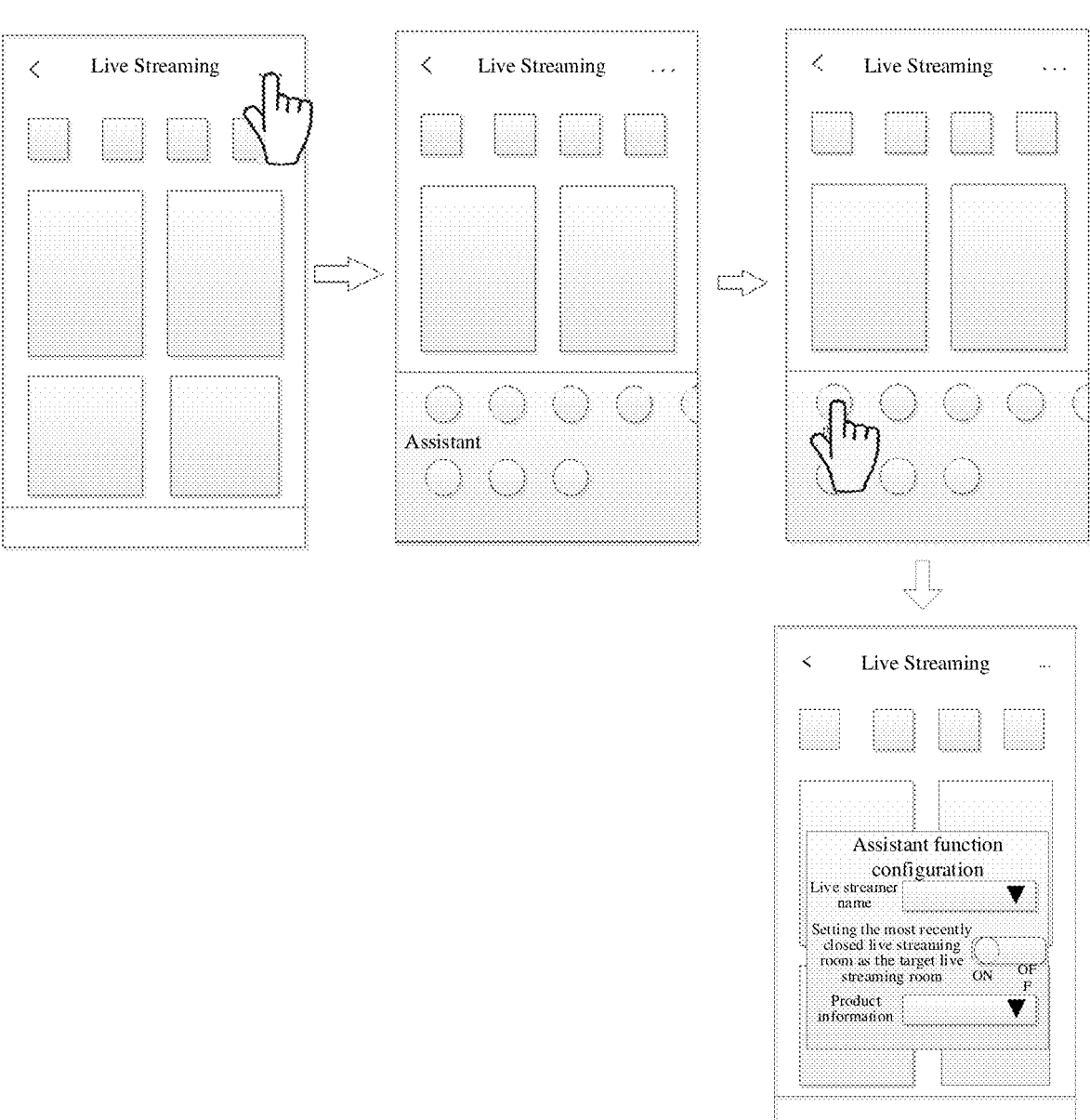
FIG. 3 is a schematic diagram of a user configuring the assistant function according to an embodiment of the present application.

In the aforementioned S11, the second preset information can be preset by the user using the "assistant" function provided by the live streaming application. Referring to FIG. 3, the user can click the assistant function control on the live streaming application interface to navigate to the assistant function configuration page or to display the configuration window on the live streaming application interface. The assistant function configuration page or configuration window provides configuration options for various types of parameters. For instance, each type of parameter configuration option has multiple candidate parameters, and the user can select one from the multiple candidate parameters to complete the configuration of that type of parameter. The user can also manually enter the configuration information for that type of parameter; this embodiment does not specifically limit this. For example, the various types of parameter configuration options may include but are not limited to: live streamer name configuration option, checkbox for selecting the most recently closed live streaming room as the target live streaming room, and configuration options for the information of preferred products. Accordingly, the second preset information may include but is not limited to: preset live streamer names, the selection status of the checkbox for setting the most recently closed live streaming room as the target live streaming room, and preset information of preferred products. The product information may include details such as product name, brand, manufacturer, product type (e.g., dresses, shoes, accessories), and price range. Based on the second preset information, the system can then determine the target live streaming room from among the live streaming rooms the user has not viewed, by retrieving the live streaming room opened by the preset live streamer name, and/or the most recently closed live streaming room, and/or the live streaming room showcasing products corresponding to the preset product information.

In the aforementioned S12, the user's currently closed live streaming room is directly set as the target live streaming room. This solution is applicable when the user was viewing a live streaming room but had to close it suddenly due to unexpected events or sleep, causing them to miss the showcased items they were interested in.

In the aforementioned S13, the applicable scenario is the same as in S12, where the user, due to unexpected events or sleep, directly touched the lock screen button on the client device to turn off the screen.

In the aforementioned 202, the first preset information can also be preset by the user using the assistant function provided by the live streaming application. Referring to FIG. 3, the user can click the assistant function control on the live streaming application interface to navigate to the assistant function configuration page or to display the configuration window on the live streaming application interface. The assistant function configuration page or configuration window provides configuration options for various types of parameters. Thus, the user can complete the configuration of both the first preset information and the second preset information at once using the assistant function. In specific implementations, the first preset information and the second preset information can be the same or different. The information content of the first threshold information and the second threshold information can be partially the same or entirely different.

In a specific embodiment, the preset information includes the first preset information and/or the second preset information. In addition to being determined based on the information preset by the user through the assistant function provided by the live streaming application, the preset information can also be comprehensively determined by combining the user's relevant historical data. That is, the method provided in this embodiment can further include the following steps:

206, acquiring historical data related to the user and/or live streaming preference information preset by the user using the assistant function;

207, determining the preset information based on the historical data and/or the live streaming preferences preset by the user.

The historical data may include, but is not limited to, the following: information on products previously purchased by the user through the live streaming platform, names of live streamers the user has followed in the past, records of live streaming objects the user has bookmarked, records of live streaming objects the user has added to their shopping cart, and records of the types of live streams the user has viewed in the past.

The aforementioned live streaming preference information may include, but is not limited to, the following: preset live streamer names, the selection status of the checkbox for setting the most recently closed live streaming room as the target live streaming room, and preset information of preferred products.

Based on the above content, step 203 in this embodiment can be: determining at least one live streaming object matching the preset information according to the live streaming content of the target live streaming room that the user has not viewed. Additionally, in step 203, if the target live streaming room is one that the user has never viewed, determining at least one live streaming object matching the preset information based on all the live streaming content of the target live streaming room. If the target live streaming room is one from which the user exited midway, determining at least one live streaming object matching the preset information based on the live streaming content of the target live streaming room after the user's exit.

In the aforementioned step 204, the push notification can be generated directly based on the object information of at least one live streaming object. For instance, directly using a live transaction link of at least one live streaming object as the push notification; or directly using the live streaming segment of at least one live streaming object as the push notification; or automatically performing an order placement operation for at least one live streaming object and then using the order information as the push notification; and so on.

In the technical solution provided by this embodiment, the target live streaming room that the user has not viewed is first identified, and the first preset information related to the user is acquired. Then, based on the live streaming content of the target live streaming room that the user has not viewed, at least one live streaming object that matches the first preset information is determined; generating and displaying push notification related to the at least one live streaming object. This way, the user does not need to continuously view the live streaming content of the target live streaming room. The user can enter the live streaming room to view after seeing the notification, or the user can find a live transaction link for at least one live streaming object based on the notification even after the live stream in the target live streaming room has ended. Additionally, the system can automatically place an order for the user and push the order information to the user, thereby reducing the time the user spends viewing the live streaming and improving the user's shopping experience.

Further, step 203 provided in this embodiment, "determining at least one live streaming object that matches the first preset information based on the live streaming content of the target live streaming room that the user has not viewed," may include:

S31, performing image recognition on the live video of the target live streaming room that the user has not viewed, and determining at least one live streaming object matching the first preset information based on the image recognition results; and/or S32, retrieving the display list of the target live streaming room from the server, and determining at least one live streaming object matching the first preset information based on the display list.

In the aforementioned S31, image recognition algorithms can be used to perform image recognition on the display objects in the live video. The identified results may include the feature information of the display objects. A matching algorithm can be used to calculate whether the feature information of the identified display objects matches the first preset information. If there is a match, the display object is considered to be the live streaming object that matches the first preset information.

It is understood that most live streaming rooms will have a display list for the current live stream. Suppose the display list includes a list of products to be showcased, which typically includes: products to be displayed, the corresponding live streaming launch time of each product, detailed product information, purchase links, and selling prices. This display list can be acquired from the server. Similarly, in specific implementations, a matching algorithm can be used to calculate the display information of the display objects in the display list that match the first preset information.

In another scenario, while the live streamer is conducting the live stream according to the display list, they may temporarily add one or two display objects for showcasing.

For these display objects that are not in the display list, the aforementioned step S31 can be used to recognize and match them with the first preset information.

Further, for step 204 provided in this embodiment, "generating push notification related to at least one live streaming object," may include:

S41, acquiring the assistant support method preset by the user using the assistant function;

S42, performing the processing task corresponding to the assistant support method for at least one live streaming object to acquire push notification related to the at least one live streaming object.

The assistant support method may include, but is not limited to, at least one of the following: extracting a live streaming segment related to the at least one live streaming object from the live video of the target live streaming room; acquiring a live transaction link of the at least one live streaming object; automatically adding to the shopping cart or favorites; automatically placing an order.

Further, when the assistant support method is automatic order placement, the aforementioned step S42, "performing the processing task corresponding to the assistant support method to acquire push notification related to the at least one live streaming object," includes:

S421, acquiring a live transaction link corresponding to the at least one live streaming object;

S422, executing the order placement operation through the live transaction link and the user's order configuration information to generate a purchase order for the at least one live streaming object;

S423, generating the push notification based on the purchase order.

The order configuration information is the configuration information related to at least one live streaming object. This information can be some default configuration information or information configured by the user in real-time for different live streaming objects. Specifically, the order configuration information may include: user information, the quantity of the live streaming objects, the specifications or models of the live streaming objects, instructions to use or not use coupons, password-free payment or non-password-free payment, and other configuration information.

User's information may include: user name, delivery address, contact phone number, and recipient information.

Further, when the assistant support method is extracting a live streaming segment related to the at least one live streaming object from the live video of the target live streaming room, the aforementioned step S42, "performing the processing task corresponding to the assistant support method to acquire push notification related to the at least one live streaming object," includes:

S421', extracting a live streaming segment related to the at least one live streaming object from the live video of the target live streaming room;

S422', storing the live streaming segment related to the at least one live streaming object on the server;

S423', acquiring the viewing link corresponding to the live streaming segment related to the at least one live streaming object;

S424', generating the push notification based on the viewing link.

The user can trigger the playback of the live streaming segment through the viewing link to learn some information about the live streaming objects, which can help them make a purchase decision. If the live transaction link of the corresponding live streaming object displayed in the live streaming segment is still within its validity period, the user can also click on the live transaction link to trigger purchase or add-to-cart operations.

The user can also preset the push path. This push path may include, but not limited to, at least one of the following: SMS, email, instant messaging applications, or interface pop-ups.

In this embodiment, by pushing live streaming objects that the user might like from the live streaming rooms they did not view, it avoids the need for the user to manually search through the playback of the corresponding live streaming room and the segments where the display objects are located. This helps the user quickly find the products they want to purchase, thereby enhancing the user's shopping experience.

FIG. 4 shows a flowchart of the information processing method provided by another embodiment of this application. The executing entity of the method provided in this embodiment can be the server or the first client in the system embodiment described above. As shown in FIG. 4, the method includes:

301, determining a target user who has not viewed the target live streaming room;

302, acquiring the preset information related to the target user;

303, determining at least one live streaming object matching the preset information based on the live streaming content of the target live streaming room that the target user has not viewed;

304, pushing the push information related to the at least one live streaming object to the client corresponding to the target user.

In the aforementioned 301, a certain number (e.g., 10,000, 20,000, or more) and/or a certain range (e.g., users who follow or bookmark the target live streamer's room, or users who have previously purchased products from the target live streamer's live stream) of users can be locked. This certain number and/or range can be defined by the target user selection rules. That is, the method provided in this embodiment can further include the following steps:

305, in response to the live streamer triggering the configuration operation of the live streamer assistant function through the live streaming application, determining the selection rules for the target users;

306, sending the selection rules for the target users to the server, so that the server can select the target users from multiple users who have not viewed the broadcaster's live streaming room based on the selection rules when the broadcaster is live streaming.

Figure 5:
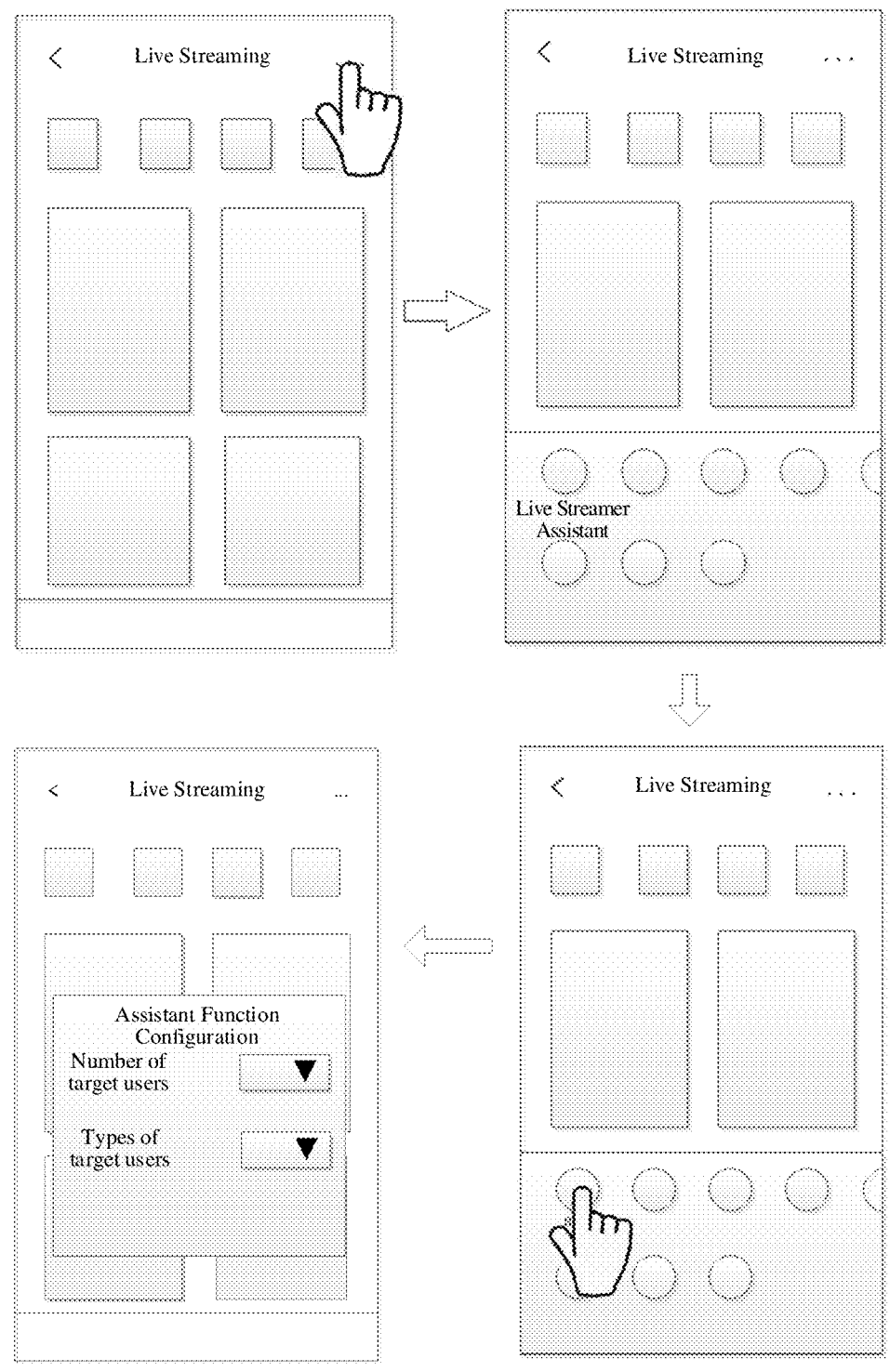
FIG. 5 is a schematic diagram of a live streamer configuring the assistant function according to an embodiment of the present application.

As shown in FIG. 5, the live streamer triggers the configuration operation of the live streamer assistant function through the live streamer assistant function control provided by the live streaming application. Referring to FIG. 5, the user can click the live streamer assistant function control on the live streaming application interface to navigate to the live streamer assistant function configuration page or display the configuration window on the live streaming application interface. The live streamer assistant function configuration page or configuration window provides various types of parameter configuration options, such as the configuration option for the number of target users, the configuration option for the types of target users (e.g., followed users, bookmarked users, or users who have historically purchased products in the past), and so on.

In the aforementioned 302, the preset information related to the target user is stored on the server.

The specific implementation of the aforementioned 303 can refer to the corresponding content in the above embodiments, which will not be elaborated here.

Further, in this embodiment, step 304, "pushing the push notification related to the at least one live streaming object to the client corresponding to the target user," may include at least one of the following:

SS41, extracting a live streaming segment related to the at least one live streaming object from the live video of the target live streaming room, and pushing the viewing link corresponding to the live streaming segment as the push notification to the client corresponding to the target user;

SS42, acquiring a live transaction link for at least one live streaming object, and pushing the live transaction link as the push notification to the client corresponding to the target user.

In this embodiment, the specific methods for extracting live streaming segment related to the live streaming objects and acquiring the live transaction link of the live streaming objects are not specifically defined. These can be implemented by referring to the solutions provided in existing literature.

In the field of e-commerce live streaming, the technical solutions provided by various embodiments of this application can be understood as offering users a live shopping assistant. Initially, when the live shopping assistant is enabled, the user-related preset information can be acquired based solely on the information configured by the user. After the live shopping assistant has been running for a while and has collected the user's historical data, it can then determine the preset information by combining the user's historical data with the information configured by the user. This preset information can be used to determine display objects of interest in live streaming rooms that the user has not viewed. The assistant can notify the user or perform actions on their behalf, such as placing orders, adding items to favorites, or adding items to the shopping cart, thereby providing assistance and enhancing the user's live shopping experience.

Additionally, it should be specifically noted that the acquisition, storage, and application of user personal information mentioned in the aforementioned content comply with relevant laws and regulations and do not violate public order and good morals.

Figure 6:
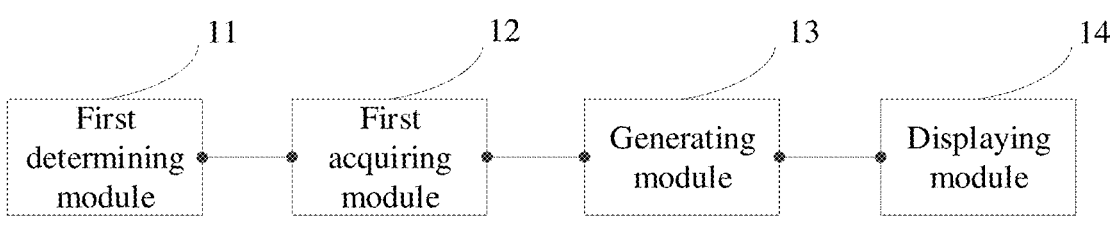
FIG. 6 is a schematic structural diagram of an information processing device according to an embodiment of the present application.

FIG. 6 illustrates a schematic structure of an information processing device provided in an embodiment of this application. As shown in FIG. 6, the information processing device includes: a first determining module 11, a first acquiring module 12, a generating module 13, and a displaying module 14. The first determining module 11 is used to determine a target live streaming room that the user has not viewed. The first acquiring module 12 is used to acquire the first preset information related to the user. The first determining module 11 is also used to determine at least one live streaming object matching the first preset information based on the live streaming content of the target live streaming room that the user has not viewed. The generating module 13 is used to generate push notification related to the at least one live streaming object. The displaying module 14 is used to display the push notification.

Further, when determining the target live streaming room that the user has not viewed, the first determining module 11 is specifically used for:

acquiring the second preset information related to the user; determining the target live streaming room that matches the second preset information from among multiple live streaming rooms that the user has not viewed; and/or responding to the user's operation of closing a live streaming room by determining the closed live streaming room as the target live streaming room; and/or responding to the user's operation of closing the screen by determining the live streaming room corresponding to the live streaming content played before the screen was closed as the target live streaming room.

Further, the preset information includes the first preset information and/or the second preset information. Accordingly, the first acquisition module 12 is also configured to acquire historical data related to the user and/or the live streaming preference information preset by the user using the assistant function. The first determination module 11 is further configured to determine the preset information based on the historical data and/or the live streaming preference information preset by the user.

Further, when the first determining module 11 determines at least one live streaming object matching the first preset information based on the live streaming content of the target live streaming room that the user has not viewed, it is specifically configured to:

performing image recognition on the live video of the target live streaming room that the user has not viewed, and determining at least one live streaming object matching the first preset information based on the image recognition results; and/or retrieving the display list of the target live streaming room from the server, and determining at least one live streaming object matching the first preset information based on the display list.

Further, when the generating module 13 generates push notification related to the at least one live streaming object, it is specifically configured to: acquiring the assistant support method preset by the user using the assistant function; performing the processing task corresponding to the assistant support method for the at least one live streaming object to acquire push notification related to the at least one live streaming object.

Further, the assistant support method includes at least one of the following:

capturing a live streaming segment from the target live streaming room related to the at least one live streaming object;

acquiring a live transaction link of the at least one live streaming object;

automatically adding to the shopping cart or favorites;

automatically placing an order.

Further, when the assistant support method is automatic order placement, the generating module 13, when performing the processing task corresponding to the assistant support method to acquiring push notification related to the at least one live streaming object, is specifically configured to:

acquiring the live transaction link corresponding to at least one live streaming object; executing the order placement operation through the live transaction link and the user's order configuration information to generate a purchase order for the at least one live streaming object; generating the push notification based on the purchase order.

Further, when the assistant support method is extracting a live streaming segment related to the at least one live streaming object from the live video of the target live streaming room, the generating module 13, when performing the processing task corresponding to the assistant support method to acquire push notification related to the at least one live streaming object, is specifically configured to:

capture a live streaming segment related to the at least one live streaming object from the live video of the target live streaming room; storing the live streaming segment related to the at least one live streaming object on the server; acquiring the viewing link corresponding to the live streaming segment related to the at least one live streaming object; generating the push notification based on the viewing link.

It should be noted that the information processing device provided in the above embodiments can implement the technical solutions described in the embodiments of the information processing method. The principles of specific implementation of the above modules or units can be referred to in the corresponding content of the aforementioned embodiments of the information processing method, which will not be elaborated here.

Figure 7:
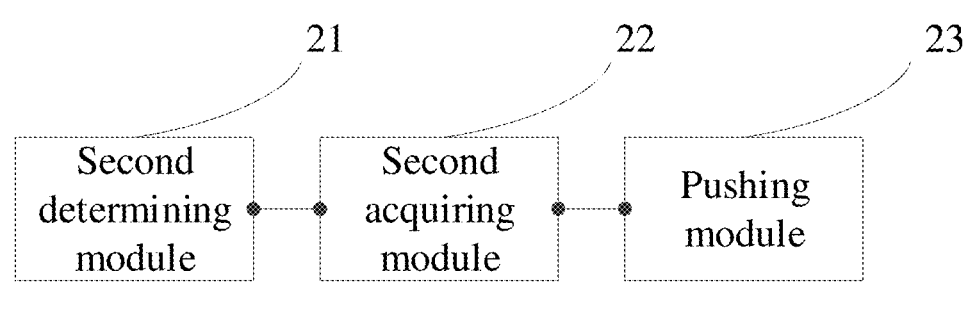
FIG. 7 is a schematic structural diagram of an information processing device according to another embodiment of the present application.

FIG. 7 shows a structure of an information processing device provided in another embodiment of this application. As shown in FIG. 7, the information processing device includes: a second determining module 21, a second acquiring module 22, and a pushing module 23. The second determining module 21 is used to determine a target user who has not viewed the target live streaming room. The second acquiring module 22 is used to acquire the preset information related to the target user. The second determining module 21 is also used to determine at least one live streaming object matching the preset information based on the live streaming content of the target live streaming room that the target user has not viewed. The pushing module 23 is used to push the push notification related to the at least one live streaming object to the client corresponding to the target user.

Further, the information processing device provided in this embodiment can also include a live streamer assistant function configuration module. The live streamer assistant function configuration module is used for determining the selection rules for the target users in response to the live streamer triggering the configuration operation of the live streamer assistant function through the live streaming application; and sending the selection rules for the target users to the server, so that the server can select the target users from multiple users who have not viewed the live streamer's live streaming room according to the selection rules when the broadcaster is live streaming.

Further, when the pushing module 23 pushes the push notification related to the at least one live streaming object to the client corresponding to the target user, it may include at least one of the following functions:

capturing a live streaming segment from the target live streaming room related to the at least one live streaming object, and pushing the viewing link corresponding to the live streaming segment as push notification to the client corresponding to the target user;

acquiring a live transaction link of the at least one live streaming object and pushing the live transaction link as the push notification to the client corresponding to the target user.

It should be noted that the information processing device provided in the above embodiments can implement the technical solutions described in the embodiments of the polar coordinate information processing method. The specific implementation principles of the above modules or units can refer to the corresponding content in the embodiments of the polar coordinate information processing method, which will not be elaborated here.

Figure 8:
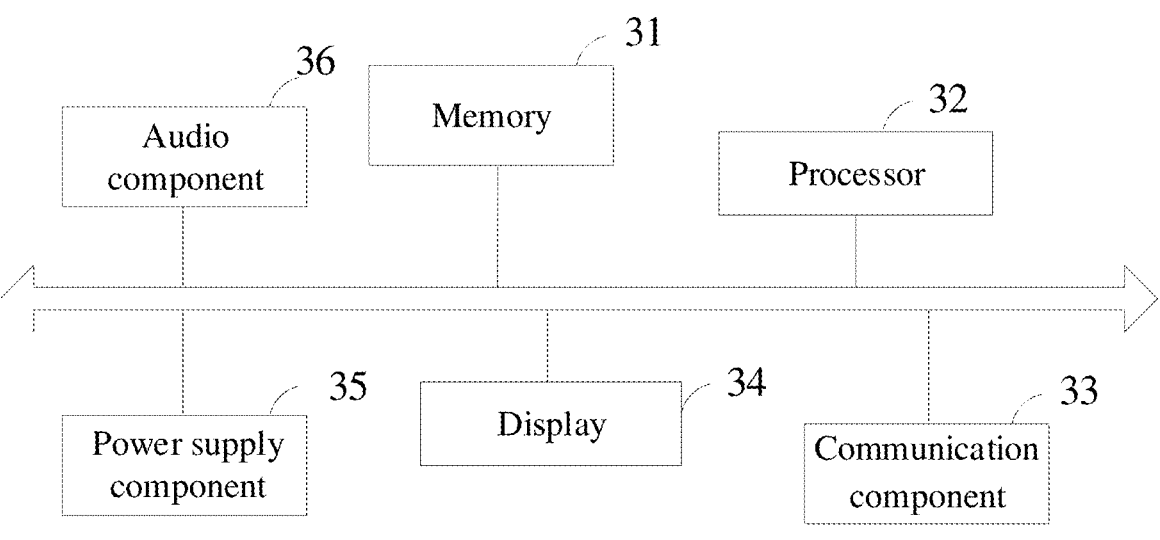
FIG. 8 is a schematic structural diagram of an electronic device according to an embodiment of the present application.

FIG. 8 shows a schematic diagram of the principle structure of an electronic device provided in an embodiment of this application. The electronic device includes a processor 32 and a memory 31. The memory 31 is used to store one or more computer instructions. The processor 32, coupled with the memory 31, is used to execute one or more computer instructions (such as computer instructions implementing data storage logic) to carry out the steps in the above embodiments of the information processing methods.

The memory 31 can be implemented by any type of volatile or non-volatile storage device or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic storage, flash memory, magnetic disks, or optical disks.

Further, as shown in FIG. 8, the electronic device also includes: a communication component 33, a power supply component 35, a display 34, and other components. FIG. 8 only schematically shows some components and does not imply that the electronic device only includes the components shown in FIG. 8.

This application also provides an embodiment of a computer program product (not shown in the accompanying drawings). The computer program product includes a computer program or instructions, which, when executed by a processor, cause the processor to perform the steps in the aforementioned method embodiments.

Accordingly, an embodiment of this application also provides a computer-readable storage medium storing a computer program, which, when executed by a computer, is capable of implementing the method steps or functions provided by the aforementioned embodiments.

From the descriptions of the above embodiments, those skilled in the art can clearly understand that the various embodiments can be implemented by means of software in conjunction with the necessary general hardware platform, and can also be implemented by hardware. Based on this understanding, the technical solutions described above can essentially be embodied in the form of a software product, which can be stored in a computer-readable storage medium, such as ROM/RAM, magnetic disk, optical disk, etc., and includes several instructions for causing a computer device (which can be a personal computer, server, or network device, etc.) to execute the methods described in the various embodiments or parts of the embodiments.

Finally, it should be noted that the above embodiments are only used to illustrate the technical solutions of the present invention and not to limit them. Although the present invention has been described in detail with reference to the aforementioned embodiments, those skilled in the art should understand that they can still make modifications to the technical solutions described in the foregoing embodiments, or make equivalent replacements of some of the technical features; these modifications or replacements do not depart from the spirit and scope of the technical solutions of the various embodiments of the present invention.

What is claimed is:

1. An information processing method, comprising:
determining a target live streaming room that a user has not viewed;
acquiring first preset information related to the user;
determining at least one live streaming object matching the first preset information based on live streaming content of the target live streaming room that the user has not viewed;

generating a push notification related to the at least one live streaming object for the user who is not viewing the target live streaming room, wherein the push notification comprises: (i) a live transaction link for the at least one live streaming object, or (ii) order information generated by automatically placing an order for the at least one live streaming object; and
displaying the push notification.

2. The method according to claim 1, wherein determining the target live streaming room that the user has not viewed comprises:
acquiring second preset information related to the user, and determining the target live streaming room that matches the second preset information from among multiple live streaming rooms that the user has not viewed; and/or
responding to the user's operation of closing a live streaming room by determining the closed live streaming room as the target live streaming room; and/or
responding to the user's operation of closing a screen by determining the live streaming room corresponding to the live streaming content played before the screen was closed as the target live streaming room.

3. The method according to claim 2, wherein preset information includes the first preset information and/or the second preset information; and the method further comprises:
acquiring historical data related to the user and/or live streaming preference information preset by the user using an assistant function; and
determining the preset information based on the historical data and/or the user's preset live streaming preference information.

4. The method according to claim 1, wherein determining at least one live streaming object matching the first preset information based on the live streaming content of the target live streaming room that the user has not viewed comprises:
performing image recognition on a live video of the target live streaming room that the user has not viewed, and determining at least one live streaming object matching the first preset information based on image recognition results; and/or
retrieving a display list of the target live streaming room from a server, and determining at least one live streaming object matching the first preset information based on the display list.

5. The method according to claim 1, wherein generating the push notification related to the at least one live streaming object comprises:
acquiring an assistant support method preset by the user using an assistant function; and
performing a processing task corresponding to the assistant support method for the at least one live streaming object to acquire the push notification related to the at least one live streaming object.

6. The method according to claim 5, wherein the assistant support method includes at least one of the following:
extracting a live streaming segment related to the at least one live streaming object from the live streaming content of the target live streaming room;
acquiring the live transaction link of the at least one live streaming object;
automatically adding to a shopping cart or favorites; and
automatically placing the order.

7. The method according to claim 6, wherein, when the assistant support method is the automatic order placement, performing the processing task corresponding to the assistant support method to acquire the push notification related to the at least one live streaming object comprises:

acquiring the live transaction link corresponding to the at least one live streaming object;

executing an order placement operation through the live transaction link and the user's order configuration information to generate a purchase order for the at least one live streaming object; and generating the push notification based on the purchase order.

8. The method according to claim 6, wherein when the assistant support method further comprises the extracting a live streaming segment related to the at least one live streaming object from the live streaming content of the target live streaming room, performing the processing task corresponding to the assistant support method to acquire the push notification related to the at least one live streaming object comprises:

extracting a live streaming segment related to the at least one live streaming object from the live streaming content of the target live streaming room;

storing the live streaming segment related to the at least one live streaming object;

acquiring a viewing link corresponding to the live streaming segment related to the at least one live streaming object; and generating the push notification based on the viewing link.

9. An information processing method, comprising:

determining a target user who has not viewed a target live streaming room;

acquiring preset information related to the target user;

determining at least one live streaming object matching the preset information based on live streaming content of the target live streaming room that the target user has not viewed; and pushing a push notification related to the at least one live streaming object to a client corresponding to the target user who is not viewing the target live streaming room, wherein the push notification comprises: (i) a live transaction link for the at least one live streaming object, or (ii) order information generated by automatically placing an order for the at least one live streaming object.

10. The method according to claim 9, further comprising:

in response to a live streamer triggering a configuration operation of a live streamer assistant function through a live streaming application, determining selection rules for the target user; and sending the selection rules for the target user to a server, so that the server can select the target user among users who have not viewed the live streamer's live streaming room according to the selection rules when the live streamer is live streaming.

11. The method according to claim 9, wherein pushing the push notification related to the at least one live streaming object to the client corresponding to the target user further comprises:

capturing a live streaming segment from the target live streaming room related to the at least one live streaming object, and pushing a viewing link corresponding to the live streaming segment as the push notification to the client corresponding to the target user.

12. A non-transitory computer-readable storage medium for processing information, configured with instructions executable by one or more processors to cause the one or more processors to perform operations comprising:

determining a target live streaming room that a user has not viewed;

acquiring first preset information related to the user;

determining at least one live streaming object matching the first preset information based on live streaming content of the target live streaming room that the user has not viewed;

generating a push notification related to the at least one live streaming object for the user who is not viewing the target live streaming room, wherein the push notification comprises: (i) a live transaction link for the at least one live streaming object, or (ii) order information generated by automatically placing an order for the at least one live streaming object; and displaying the push notification.

13. The non-transitory computer-readable storage medium according to claim 12, wherein determining the target live streaming room that the user has not viewed comprises:

acquiring second preset information related to the user, and determining the target live streaming room that matches the second preset information from among multiple live streaming rooms that the user has not viewed; and/or responding to the user's operation of closing a live streaming room by determining the closed live streaming room as the target live streaming room; and/or responding to the user's operation of closing a screen by determining the live streaming room corresponding to the live streaming content played before the screen was closed as the target live streaming room.

14. The non-transitory computer-readable storage medium according to claim 13, wherein preset information includes the first preset information and/or the second preset information; and the operations further comprise:

acquiring historical data related to the user and/or live streaming preference information preset by the user using an assistant function; and determining the preset information based on the historical data and/or the user's preset live streaming preference information.

15. The non-transitory computer-readable storage medium according to claim 12, wherein determining at least one live streaming object matching the first preset information based on the live streaming content of the target live streaming room that the user has not viewed comprises:

performing image recognition on a live video of the target live streaming room that the user has not viewed, and determining at least one live streaming object matching the first preset information based on image recognition results; and/or retrieving a display list of the target live streaming room from a server, and determining at least one live streaming object matching the first preset information based on the display list.

16. The non-transitory computer-readable storage medium according to claim 12, wherein generating the push notification related to the at least one live streaming object comprises:

acquiring an assistant support method preset by the user using an assistant function; and performing a processing task corresponding to the assistant support method for the at least one live streaming object to acquire the push notification related to the at least one live streaming object.

17. The non-transitory computer-readable storage medium according to claim 16, wherein the assistant support method includes at least one of the following:

extracting a live streaming segment related to the at least one live streaming object from the live streaming content of the target live streaming room;

acquiring the live transaction link of the at least one live streaming object;

automatically adding to a shopping cart or favorites; and automatically placing the order.

18. The non-transitory computer-readable storage medium according to claim 17, wherein, when the assistant support method is the automatic order placement, performing the processing task corresponding to the assistant support method to acquire the push notification related to the at least one live streaming object comprises:

acquiring the live transaction link corresponding to the at least one live streaming object;

executing an order placement operation through the live transaction link and the user's order configuration information to generate a purchase order for the at least one live streaming object; and generating the push notification based on the purchase order.

19. The non-transitory computer-readable storage medium according to claim 17, wherein when the assistant support method further comprises the extracting a live streaming segment related to the at least one live streaming object from the live streaming content of the target live streaming room, performing the processing task corresponding to the assistant support method to acquire the push notification related to the at least one live streaming object comprises:

extracting a live streaming segment related to the at least one live streaming object from the live streaming content of the target live streaming room;

storing the live streaming segment related to the at least one live streaming object;

acquiring a viewing link corresponding to the live streaming segment related to the at least one live streaming object; and generating the push notification based on the viewing link.

* * * * *